United States Patent [19]

Lippert

[11] Patent Number: 4,754,327
[45] Date of Patent: Jun. 28, 1988

[54] SINGLE SENSOR THREE DIMENSIONAL IMAGING

[75] Inventor: Thomas M. Lippert, Hennepin, Minn.

[73] Assignee: Honeywell, Inc., Minneapolis, Minn.

[21] Appl. No.: 28,359

[22] Filed: Mar. 20, 1987

[51] Int. Cl.$^4$ .............................................. H04N 13/00
[52] U.S. Cl. ........................................ 358/88; 358/92; 350/136
[58] Field of Search ....................... 358/88, 89, 91, 92, 358/3; 350/130, 136

[56] References Cited

U.S. PATENT DOCUMENTS

| | | | |
|---|---|---|---|
| 3,527,880 | 9/1970 | Gordon | 358/88 |
| 3,598,032 | 8/1971 | Bohn | 358/92 |
| 4,214,267 | 7/1980 | Roese et al. | 358/88 |
| 4,281,341 | 7/1981 | Byatt | 358/92 |
| 4,623,219 | 11/1987 | Trias | 350/351 |
| 4,684,990 | 8/1987 | Oxley | 358/88 |

FOREIGN PATENT DOCUMENTS 57-37993 3/1982 Japan ..................................... 358/88

Primary Examiner—James J. Groody
Assistant Examiner—John K. Peng
Attorney, Agent, or Firm—John G. Shudy, Jr.

[57] ABSTRACT

A single sensor three dimensional imaging system mounted on a moving platform for displaying stable and clear near real-time or delayed time images with effective three dimensional or stereo characteristics based on radial parallax, in monochrome or color.

22 Claims, 9 Drawing Sheets

SINGLE SENSOR THREE DIMENSIONAL IMAGING

BACKGROUND OF THE INVENTION

The present invention relates generally to sensor imaging and particularly to three dimensional sensor imaging. More particularly, the invention relates to three dimensional imaging with a single sensor.

The related art incorporates both two dimensional and three dimensional imaging with single and double sensors, respectively. Some related art may consist of a system with one sensor or camera which is time-shared between binocular-type optics using a mechanized mirror assembly allegedly producing a three dimensional characteristic caused by a horizontal parallax limited to the distance between left and right optics in front of the camera lens. The disadvantages of such system are that it has an undesirable horizontally "jogging" image of dynamic scenes and a severely limited stereo base.

Similar art tends to suggest a single camera system producing a vertically vibrated image requiring only biocular viewing. This system is reputed to produce some depth effect upon the viewed image but has bad side effect including vertical image instability.

Other related art of the three dimensional imaging resorts to a double sensor system. The double sensor system relies on horizontal parallax for three dimensional imaging. The only known related art which utilizes single sensor three dimensional imaging for binocular display is a situation where several photographs are taken of objects moving along side a platform holding the sensor. The several photographs are taken at different points in time and then are presented with a three dimensional effect to the viewer through horizontal parallax. However, this type of three dimensional system is non-effectual for objects moving toward the platform.

Effective stereo visual methods of related art for observing objects in the forward direction of the platform rely on two sensors. Such binocular sensor system mass, volume, power consumption, and cost are disadvantageous and sometimes prohibitive. Three dimensional imaging compared to two dimensional imaging doubles most of the hardware signal processing capacity requirements. Further, due to size, aerodynamics and heat-tolerance specifications, wide displacement of binocular sensors for horizontal parallax needed for effective three dimensional imaging prohibit the use of binocular sensors on many platforms, such as surveillance or combat aircraft.

The present invention obviates the disadvantages of the related art and offers surprising new advantages over that art.

SUMMARY OF THE INVENTION

The present invention requires only one sensor for three dimensional imaging. In essence, the invention has a sensing means, processing means and three dimensional display means. The processing means has converting means for converting image analog signals to digital signals which are sent on to buffer means. These images are appropriately selected by multiplexing means from buffer means for effecting three dimensional images to the display means for viewing in color or monochrome. The images viewed may be in near real-time or of delayed recordings. The buffer means and multiplexing means receive signals from microprocessor means which does modeling from parameters, such as altitude, velocity and its vector, of the platform upon which the sensing means is mounted. The image signals to the display means may be combined or conditioned by signal conditioning means.

In FIG. 1, assume sensor 12 at point A translating horizontally with respect to the image world 14, or vice versa, and denote its relative progression in the terms of time ($\Delta t$), then the average relative velocity of sensor 12 will determine sensor positions and, therefore, the separation, or stereo base, inherent to a pair of images captured at times A and B. This is the standard aerial method of stereo photo reconnaissance in which a single sensor platform flies in a straight line, constant altitude, and fixed velocity course, taking pictures at regular intervals (i.e.,$\Delta t$) and producing definite stereo left (L) and right (R) images. The situation is different if the relative motions of sensor 12 and the world 14 are altered as shown in FIG. 2. The sensor 12 flies "into" the object field 14 which it is imaging, creating radial expansions of the objects 14 about the sensor's axis 16 of motion. The advantage of the present invention is that it transforms the effects of radial expansion disparities into a good stereo image. A further advantage of the invention is that it processes the images of radial expansion into a "live" moving image, very useful for dynamic situations. Still another advantage of the present invention is that an observer perceiving the three dimensional image shall continue to perceive a three dimensional image upon a lateral tilt of the observer's head or the rotation of the display due to the resultant features of processing of images with radial parallax. The invention also has capability of providing "strong" stereo visual effect for very distant objects as well as near objects.

DETAILED DESCRIPTION OF THE PREFERRED EMBODIMENT

Figure 1:
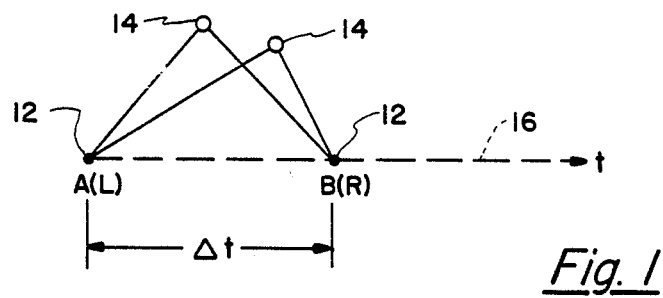
FIG. 1 illustrates sensor positions lateral to world objects for obtaining three dimensional images.
Figure 2:
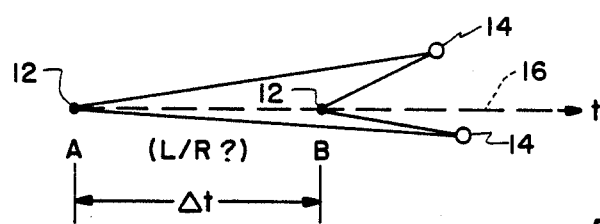
FIG. 2 shows movement of a sensor toward world objects.
Figure 3:
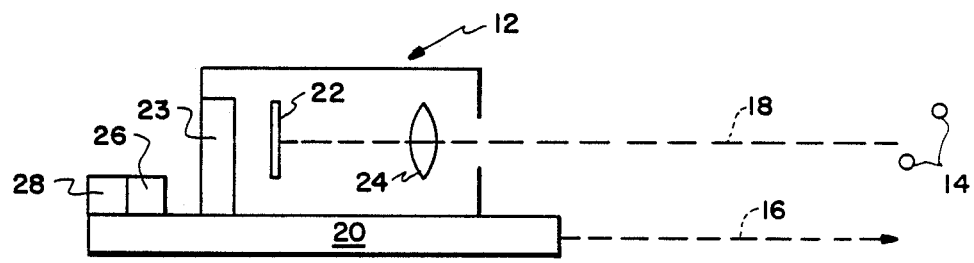
FIG. 3 shows an imaging sensor configuration of the present embodiment.

FIG. 3 shows imaging sensor 12 in relationship to platform 20 which moves along axis 16. Sensor 12 has a set of optics 24, focal plane 22, and associated sensor electronics 23 for receiving the image of objects 14 along optical axis 18.

Figure 4:
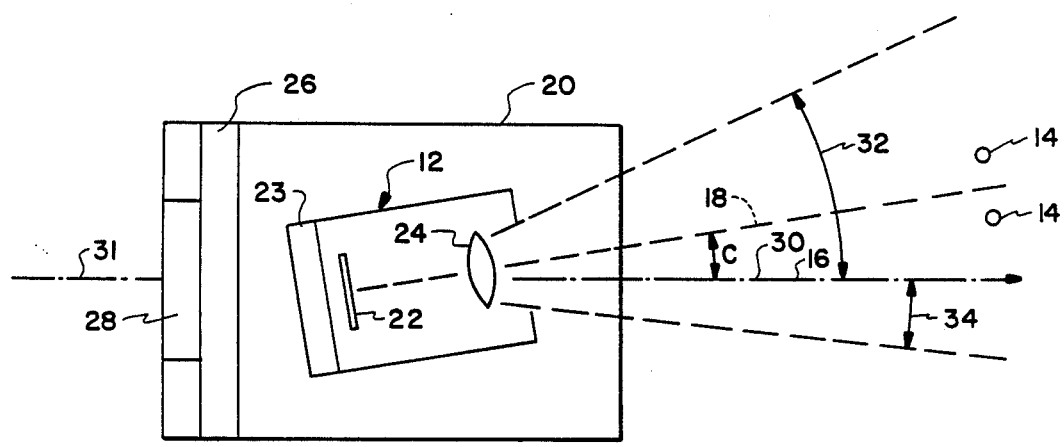
FIG. 4 shows a top view of the imaging sensor configuration.

FIG. 4 shows a top view of the sensor 12 and platform 20. As indicated in FIG. 4 the optical axis 18 may not necessarily be parallel with the direction of the platform axis 16. For purposes of describing the present embodiment of the invention, optical axis 18 is assumed to be in a plane parallel to the plane that the direction of motion axis 16 is in. The direction of optical axis 18 relative to the direction of motion axis 16 can be measured as angle C. Platform 20 may contain image processing electronics 26 and display 28.

Figure 5:
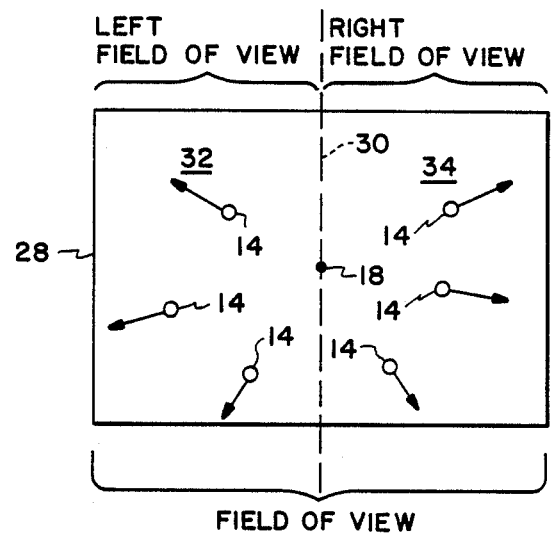
FIG. 5 shows a displayed image having a split field of view.

FIG. 5 shows an image of display 28 when angle C is equal to 0 degrees, that is, axes 16 and 18 are parallel to each other. The field of view of display 28 is split into a left field of view 32 and right field of view 34 by inertial field midline 30. Inertial field midline 30 is a line which coincides with direction of motion axis 16 and reveals the direction of movement of platform 20. Midline 30 is perpendicular to the horizontal plane of platform 20. Display 28 shows a video image of objects 14. The arrows adjacent to each of objects 14 reveal the direction of the motion of each object 14 on display 20 over a period time as platform 20 moves along axis 16. Objects 14 flow away from optic axis 18 at the middle of display 28 while platform 20 moves in a direction forward along motion axis 16 which coincides with optical axis 18 in FIG. 5.

Figure 6:
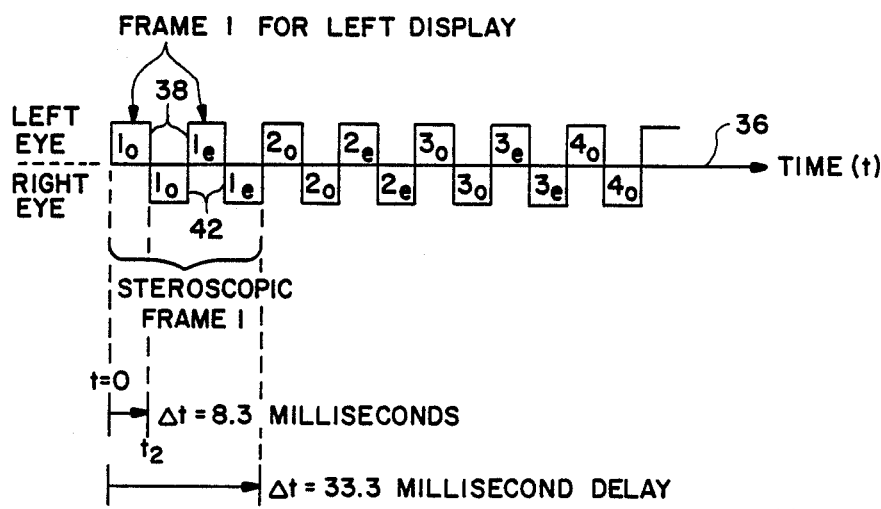
FIG. 6 shows a time-based sequence of information for right eye and left eye viewing.
Figure 7:
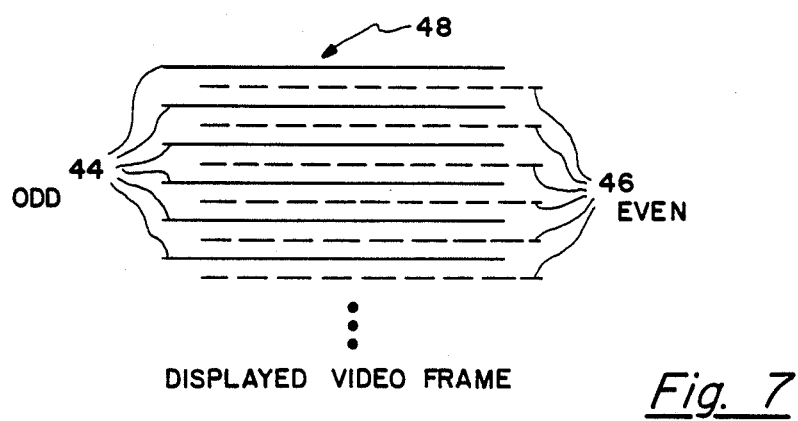
FIG. 7 illustrates an interlacing of fields on a display.

FIG. 6 is an illustration of the sequence of display information presented to the left eye and to the right eye of an observer. The timing of this information has its base in 60 Hertz per second. Blocks 38 and 42 of video information are presented to display 28 in a sequential order during a period of time represented by time axis 36. Blocks 38 represent fields of information presented on display 28 for the left eye only. Blocks 42 of fields of information are presented on display 28 for the right eye only. Block 38 labeled $l_o$ represents a field of odd video scan lines 44 for frame 48 in FIG. 7. Block 38 labeled $l_e$ represents even field scan lines 46 for frame 48. The first two blocks 38 represent the first frame for the left eye as presented on display 28 in the form of video frame 48. Video frame 48 is composed of interlaced fields of odd lines 44 and even lines 46. Blocks 42 labeled $l_o$ and $l_e$ represent the two fields of odd lines 44 and even lines 46 which are interlaced to form video frame 48 on display 28 for the right eye. The first two blocks 42 compose the first frame for the right eye. The first two blocks 38 and the first two blocks 42 a described above compose a stereoscopic frame.

The delay between the image presented to the left eye and the image presented to the right eye is the amount of time that block 38 labeled $l_o$ takes to be presented in a video frame 48 on display 28. At the end of the presentation of the odd field for the left eye, the odd field for the right eye is started and presented in video frame 48 on display 28. In this particular instance, the delay is 8.33 milliseconds. However the time that the field as represented by block 42 labeled $l_o$ may be presented at a time greater than 8.33 millisecond delay from the start of block 38 labeled $l_o$, or that delay may be less than 8.33 milliseconds limited only by the sensor field duration. Also, the delay may be the duration of presenting a complete frame to one eye up to the time a new frame is presented to the other eye. In the present embodiment, the design described in the preceding and present paragraphs is for a Stereographics Corporation, San Rafael, Calif. 94912, field sequential display in which the CRT screen display 28 is "time shared" by the left and right eyes. The display has an LCD cover that functions as a light valve which alternates with different polarization on the light emitted from the screen or display 28. One polarization is clockwise and the other polarization is counter clockwise and they are alternated so that the left eye sees information on display 28 which the other eye does not and vice versa according to the polarization mode of the displayed information on the screen. The observer wears a passive set of glasses which permits one eye to see the image on the display which has the same polarization as the eye piece over the respective eye and permits the other eye to see an image of another polarization due to the other eye piece having the latter polarization. Since these polarizations are circular and the parallax is radial, the observer can still perceive three dimensional images even when his head is in a tilted position.

Figure 8:
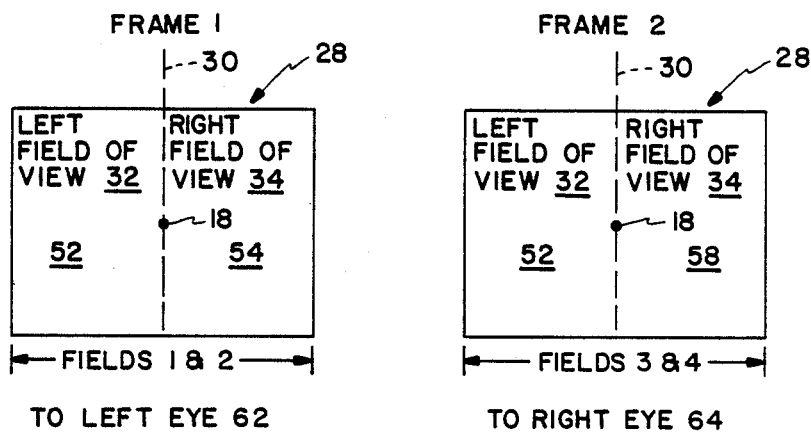
FIG. 8 reveals frames for imaging.
Figure 9:
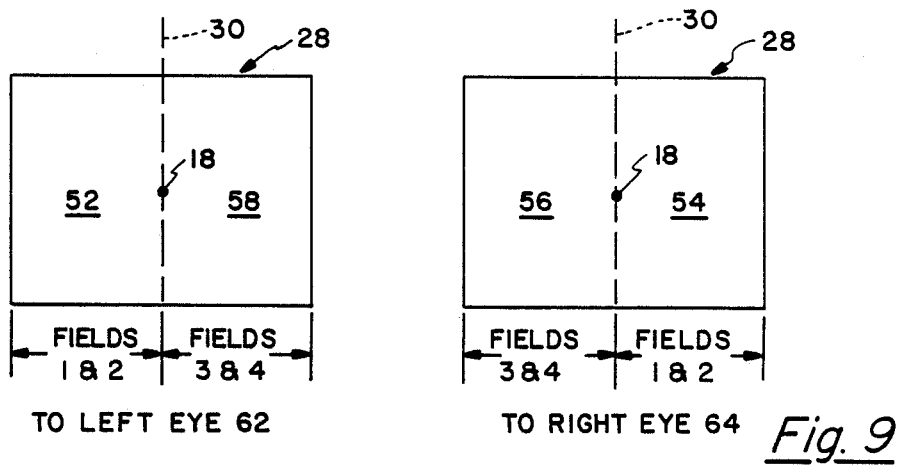
FIG. 9 reveals processed frames having recombined subframes.

FIG. 8 shows a frame for left eye 62 and a frame for right eye 64 respectively on display 28. Similar to FIG. 5, the field of view as represented by the two frames is divided by inertial field midline 30. In FIG. 8, the frame to left eye 62 has a left field of view 52 and right field of view 54, and the frame to right eye 64 has a left field of view 56 and a right field of view 58. The frame to left eye 62 may be composed of fields 1 and 2 and the frame for right eye 64 may be composed of fields 3 and 4. The frame to right eye 64 is delayed in time relative to the frame to left eye 62. The delay of the frame to right eye 64 may be increased by using later fields such as 5 and 6, or 7 and 8, etc. The frames in FIG. 8 may each be cut into subframes corresponding to the left and right fields of view, respectively, on inertial field midline 30. Then the respective subframes 52, 54, 56 and 58 may be recombined in a manner as shown in FIG. 9, that is, subframes 52 and 58 are combined to be presented to left eye 62 and subframes 56 and 54 are combined to be presented to right eye 64. This recombination is necessary to eliminate any pseudo-stereo sometimes present in the image.

Figure 11:
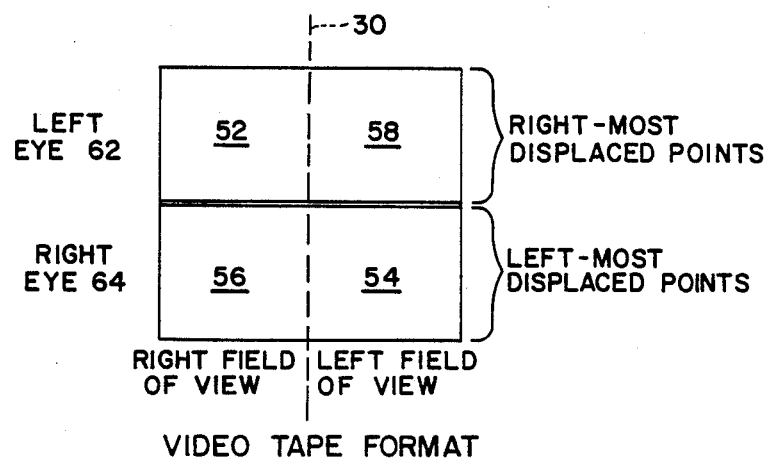
FIG. 11 is a video tape format for recording three dimensional images.
Figure 10:
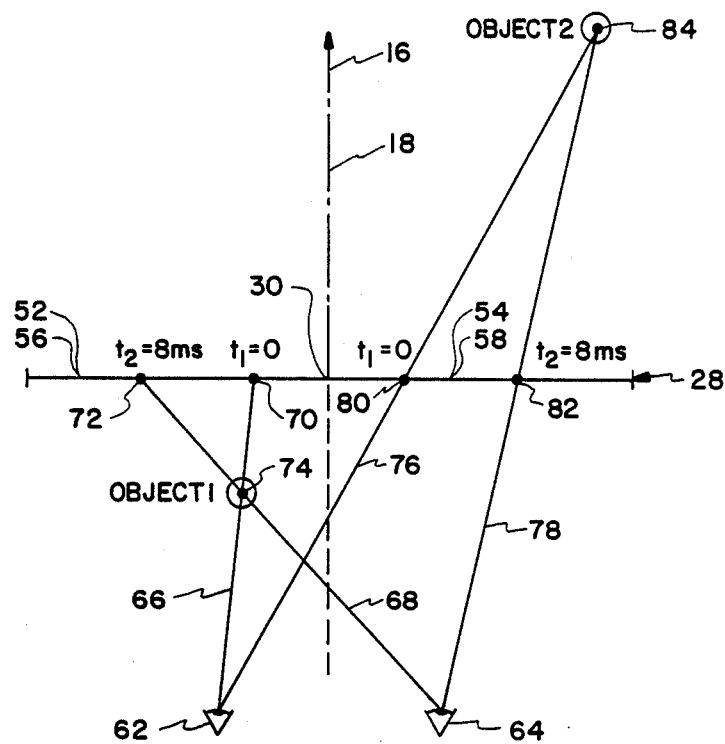
FIG. 10 illustrates pseudo-stereo of the right field of view.

FIG. 10 and 11 explain why the frames are cut along midline 30 and recombined as illustrated in FIG. 9. FIG. 10 shows a partially desired three dimensional effect of objects to the viewer as presented with frames in the format as shown in FIG. 8, that is, with subframes 52 and 54 presented to left eye 62 and subframes 56 and 58 to right eye 64. The observer looking at display 28 sees frames 1 and 2 overlapping each other in FIG. 10. Display 28 shows a moving object 1 in the left fields of view having subframes 52 and 56 for left and right eyes 62 and 64, respectively, and a moving object 2 in the right fields of view having subframes 54 and 58 for the left and right eyes 62 and 64, respectively. In observing the display 28 as in FIG. 10, objects 1 and 2 are flowing outward as moving platform 20 directly approaches them with inertial midline 30 being the direction of motion of platform 20. At $t_1$ equal to time 0, object 1 is represented by spot 70 which is displayed on subframe 52 and visible only to left eye 62 along optical axis 66. At $t_2$ equal to 8 milliseconds, object 1 is represented by spot 72 on subframe 56 which is seen only by right eye 64 along optical axis 68. Optical axis 66 of left eye 62 and optical axis 68 of right eye 64 intersect at point 74. Object 1 appears at the intersection of optical axe 66 and 68 closer to the observer than the surface of display 28. The surface of display 28 is depicted as being perpendicular to the surface of FIG. 10 itself.

The three dimensional effect is different for the right field of view a portrayed by subframes 54 and 58. Object 2 is represented at $t_1$ equal to 0 by spot 80 on the screen as displayed by subframe 54 which is visible to only the left eye 62 along optical axes 76. At $t_2$ equal to 8 milliseconds, object 2 is represented by spot 82 on the screen by subframe 58 which is seen only by right eye 64 along optical axis 78. The radial parallax due to motion of platform 20 towards the objects 14 is responsible for the representation of object 2 moving from spot 80 to spot 82 during the duration of 8 milliseconds, similar to the movement of the representation of object 1 from spot 70 to spot 72 in the left field of view. In the right field of view, left eye 62 sees object 2 along optical axis 76 at spot 80 and right eye 64 sees object 2 at spot 82 along optical axis 78 appearing to be displayed on the screen at approximately the same time. The intersection of optical axis 76 of left eye 62 and optical axis 78 of right eye 64 intersect at point 84 where object 2 appears to the observer; that is, object 2 at point 84 has the appearance at being a further distance from the observer than the surface of the screen of display 28.

As for object 1 in the left field of view, the duration of time between spots 70 and 72 increases while platform 20 is in a forward moving direction, spots 70 and 72 move further apart from each other and intersection 74 comes closer to the observer thus giving the observer a perception of object 1 approaching him. The contrary is true for the right field of view, in that as platform 20 continues to move forward, spots 80 and 82 move further apart resulting in the intersection 84 of optical axes 76 and 78 moving further into the back of the screen surface and causing object 2 to appear at a greater distance as time goes on, or giving the observer a perception of object 2 receding from the observer in terms of binocular disparity (although object 2 grows in size on the display as it would in approaching the sensor). The reason for this phenomena is that the displacements of spots 70 and 72 and 80 and 82 are in effect mirror images of each other thereby resulting in stereoscopic vision for the left field of view and pseudo-stereoscopic vision for the right field of view as just illustrated in conjunction with FIG. 10.

To solve the anomaly of approaching objects appearing to recede which is due to the presentation of sensor information being imaged at one time as frame one for example, to one eye (viz., left eye 62) and being imaged at another time to the other eye, that information is presented as right-most displaced on the screen to left eye 62 and as the left-most displaced to right eye 64. This approach results in a full stereoscopic vision for both the left and right fields of view to the observer. The latter presentation is accomplished by frame buffering, cutting and recombining which is well known in the digital video electronic art. FIG. 11 shows a field-sequential display video tape format for one full stereoscopic frame. Subframes 52 and 58 are put together so that the earliest events which left eye 62 sees consist of right-most displaced points. Right eye 64 sees subframes 56 and 54 showing the left-most displaced points as representing the earliest events. This subframe combination is illustrated by FIG. 9 as noted above.

Figure 12:
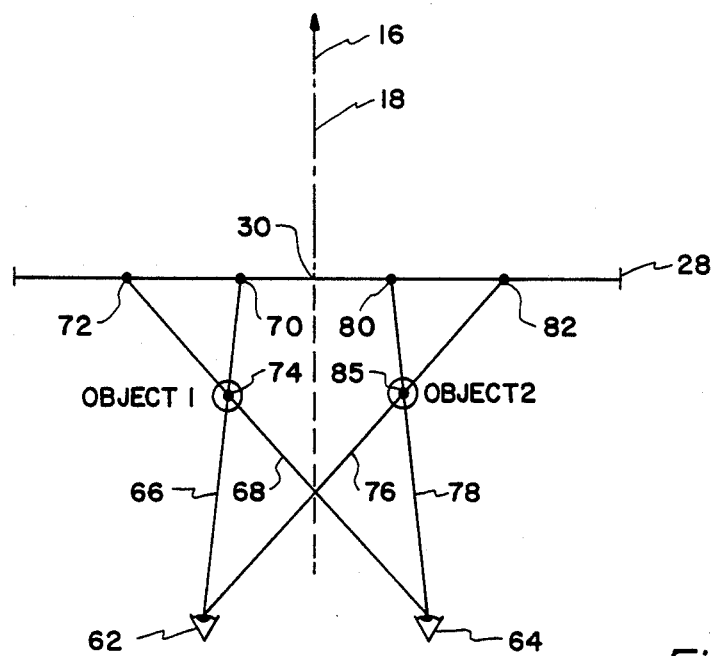
FIG. 12 illustrates true stereo for the full field of view.

FIG. 12 illustrates full stereo vision of objects 1 and 2 for both the left and right fields of view. FIG. 12 is similar to the diagram in FIG. 10 except for the right field of view. When subframe 52 is shown to left eye 62 displaying spot 70 at $t_1$ equal to 0 time, subframe 58 is presented to left eye 62 showing spot 82 at time $t_2$ equal to 8 milliseconds. Right eye 64 sees another set of subframes 54 and 56 which are not seen by left eye 62. Subframe 54 presents to right eye 64 spot 80 at $t_1$ equal to 0 time reference. Subframe 56 presents to right eye 64 spot 72 at $t_2$ equal to 8 milliseconds. As in FIG. 10, left eye 62 sees spot 70 along axis 66 and right eye 64 sees spot 72 along axis 68. Axes 66 and 68 intersect at point 74 presenting a perception of object 1 in stereoscopic vision represented to the observer as being closer to the observer than the surface of the screen or display 28. As to the right field of view, left eye 62 sees along axis 76 spot 82 at $t_2$ equal to 8 milliseconds. Right eye 64 sees spot 80 at $t_1$ equal to 0 time along axis 78. The axes 76 and 78 intersect at point 85 thus presenting a stereoscopic presentation of object 2 to the observer. The observer perceives object 2 to be closer to him than the surface of the screen or display 28. This results in a true stereoscopic display from a single sensor for the full field of view.

As sensor 12 is rotated, the invention preserves the three dimensional characteristic of the images presented to the observer on display 28. Optical axis 18 of sensor 12 and direction of motion 16 of platform 20 in FIG. 4 need not be coincident; in other words, angle C need not be 0 degrees. The inertial field midline 30 of FIG. 5, which indicates the direction of motion 16 of platform 20, defines the split between the left field of view 32 and the right field of view 34 which consist of subframes 52 and 56, and 58 and 54, respectively. The inertial field midline 30 discriminates between the right and left flows of observed objects 14.

Figure 13:
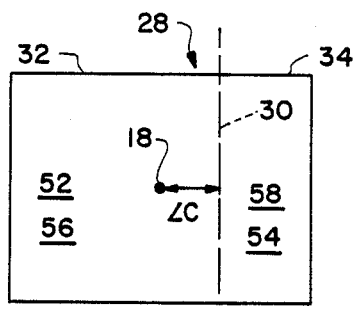
FIG. 13 shows subframe distribution of the display as the sensor turns to the left.

FIG. 13 shows display 28 as sensor 12 is "panned" to the left. Inertial field midline 30 always reveals the direction of the platform 2. On which sensor 12 is mounted. As sensor 12 is panned to the left, left field of view 32 increases in size and right field of view 34 decreases in size. Correspondingly, subframes 52 and 56 increase in size and subframes 58 and 54 decrease in size. Angle C between optical axis 18 and inertial field midline 30 increases. Inertial field midline 30 on display 28 splitting left field of view 32, consisting of subframes 52 and 56, from right field of view 34, consisting of subframes 58 and 54, is effected through frame buffering, frame cutting and frame recombination like that as noted in FIG. 9 above. The frame cuts are made along the inertial field midline 30 as defined by direction of motion 16 of platform 20. On display 28, the position of the inertial field midline 30 may shift left or right across the field of view as sensor 12 pans right or left, respectfully.

Figure 14:
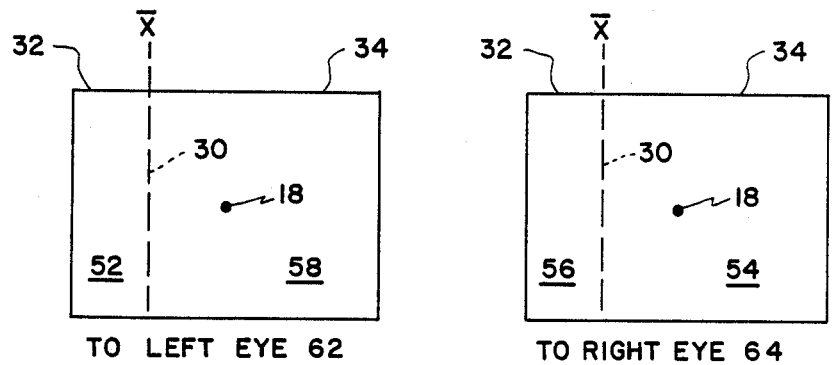
FIG. 14 shows displays for the left and right eyes, respectively, as the sensor turns to the right.
Figure 15:
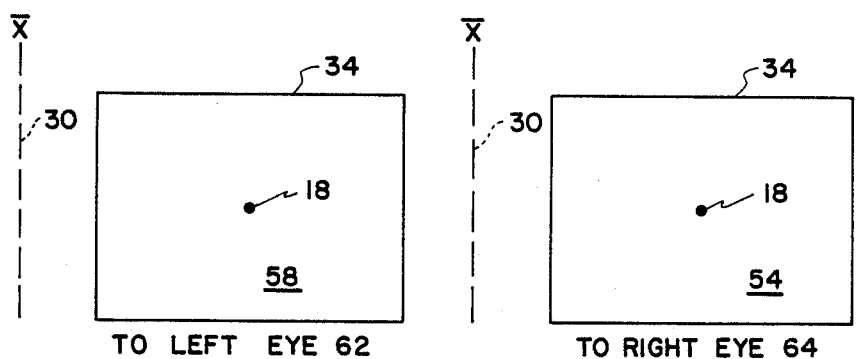
FIGS. 15 and 16 show the resultant subframes of the displays as the sensor is rotated far to the right or left.
Figure 16:
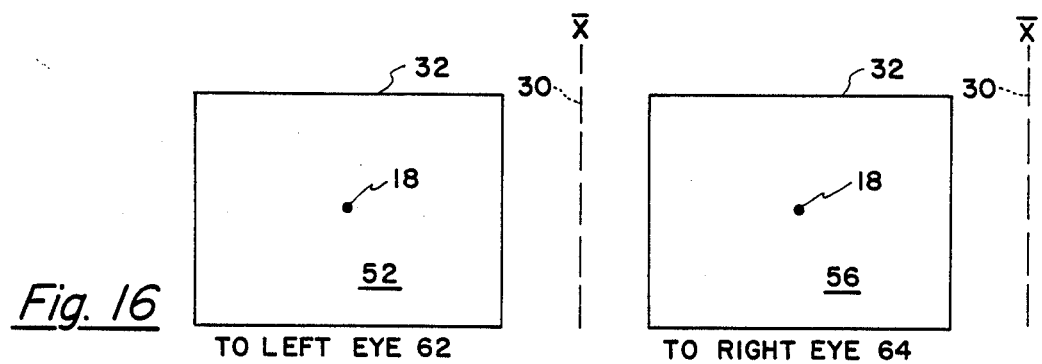

Sensor 12 may be rotated 360° relative to platform 20. FIG. 14 shows the display to left eye 62 and display to right eye 64, respectively, as sensor 12 is rotated to the right. The inertial field midline 30 in both displays slews to the left in the sensor 12 field of view resulting in a decrease in size of the left field of view 32 in the presentations to the left eye 62 and right eye 64 respectfully, and an increase in right field of view 34 in the presentations to the left eye 62 and right eye 64, respectively. If sensor 12 continues to rotate, at some point, the inertial field midline 30 will move so far to one side as to not be coincident with any portion of the display as shown in FIG. 15. This results in an observer seeing only the right field of view 34 on display 28 and only subframe 58 being presented to left eye 62 and only subframe 54 being presented to right eye 64, respectively. Similarly, in FIG. 16, sensor 12 is rotated to the left and inertial field midline 30 slews to the right until it leaves sensor 12 field of view, thus allowing the observer to see only left field of view 32 presenting subframe 52 to left eye 62 and subframe 56 to right eye 64, respectively. Whether the sensor rotates far to right or to the left the flow of objects 14 provides an appropriate delay for a side-looking single sensor three dimensional presentation of the objects.

Figure 17A:
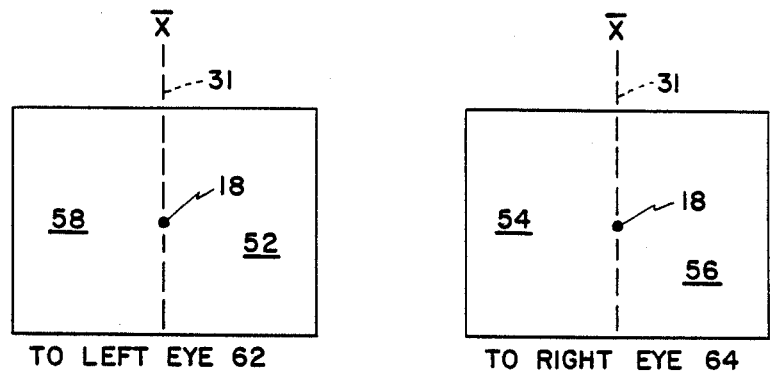
FIG. 17a reveals the subframe arrangement on the display when the sensor is rotated 180° from the forward direction of a moving platform.
Figure 17B:
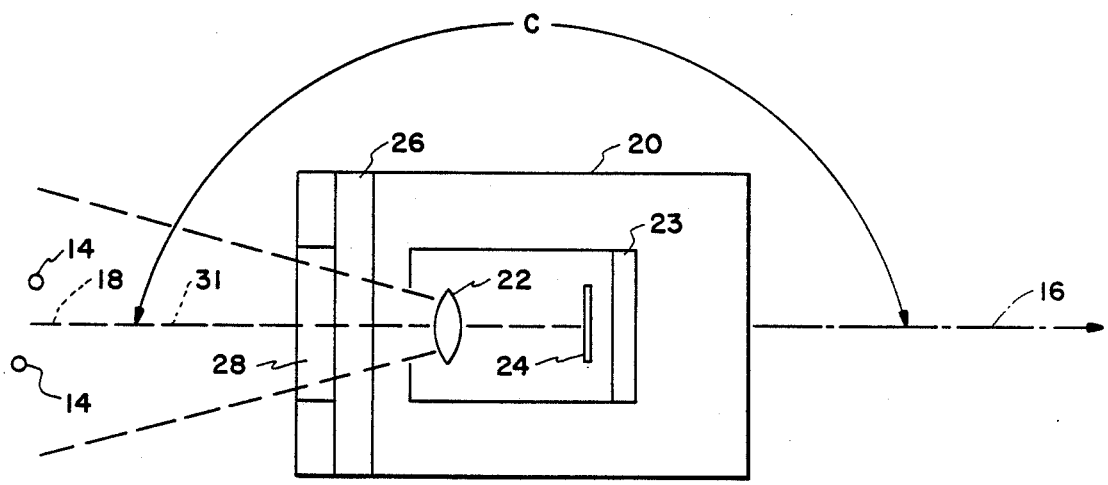
FIG. 17b shows a top view of the sensor sensing objects receding from the platform.

Sensor 12 may be rotated so that its field of view spans an inertial field midline 31 as sensor 12 looks to the rear of platform 20 as depicted in FIGS. 17a and 17b. Sensor 12 in this position results in angle C being equal to 180° between optical axis 18 and direction of movement 16. When sensor 12 is looking from the rear of platform 20 as platform 20 is still moving forward, sensor 12 sees receding objects having a flow moving inward resulting in a radial parallax. Subframe 58 and subframe 52, divided by inertial field midline 31, are presented to left eye 62, and subframe 54 and subframe 56, divided by inertial field midline 31, are presented to right eye 64. The observer continues to see the three dimensional effect of objects 14. Subframes 58 and 52, and 54 and 56, respectively, are combined through frame buffering, cutting and recombining as well known in the field of digital video electronic arts. Thus, there is unlimited rotation or 360° panning of a single sensor capable of providing a three dimensional image for all directions from a moving platform.

Figure 18:
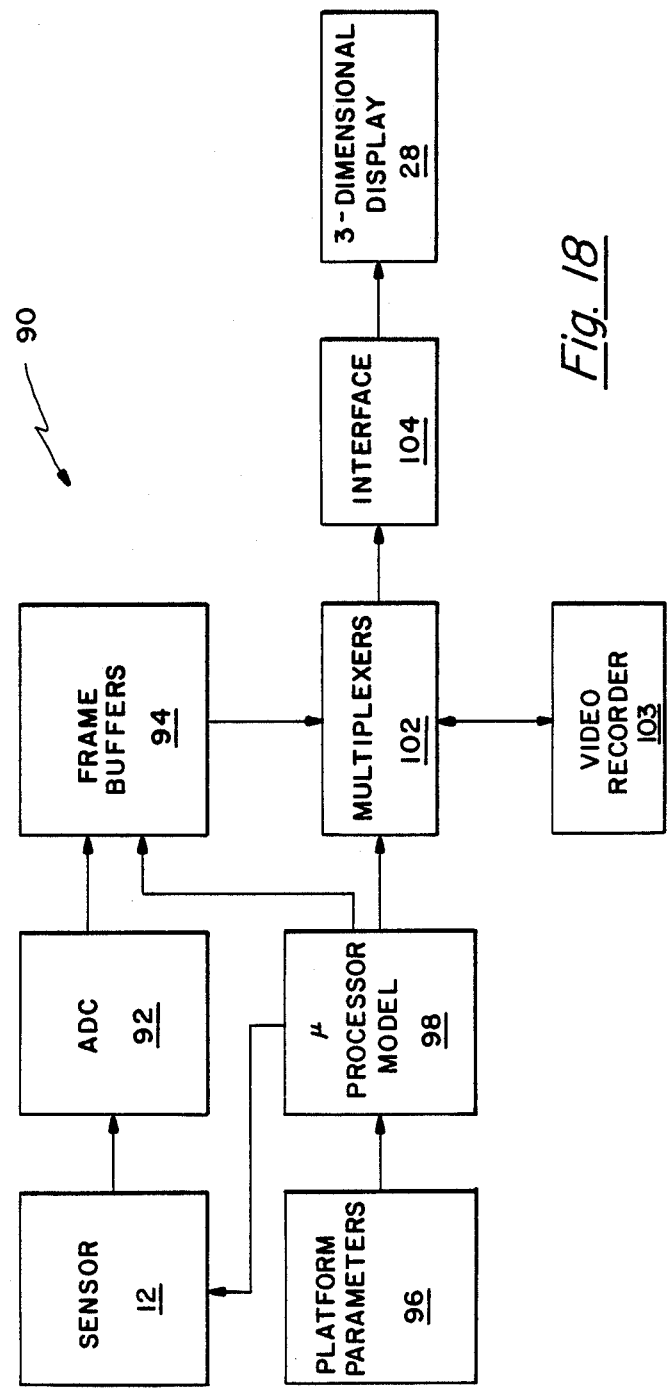
FIG. 18 is a block diagram of one embodiment.
Figure 19:
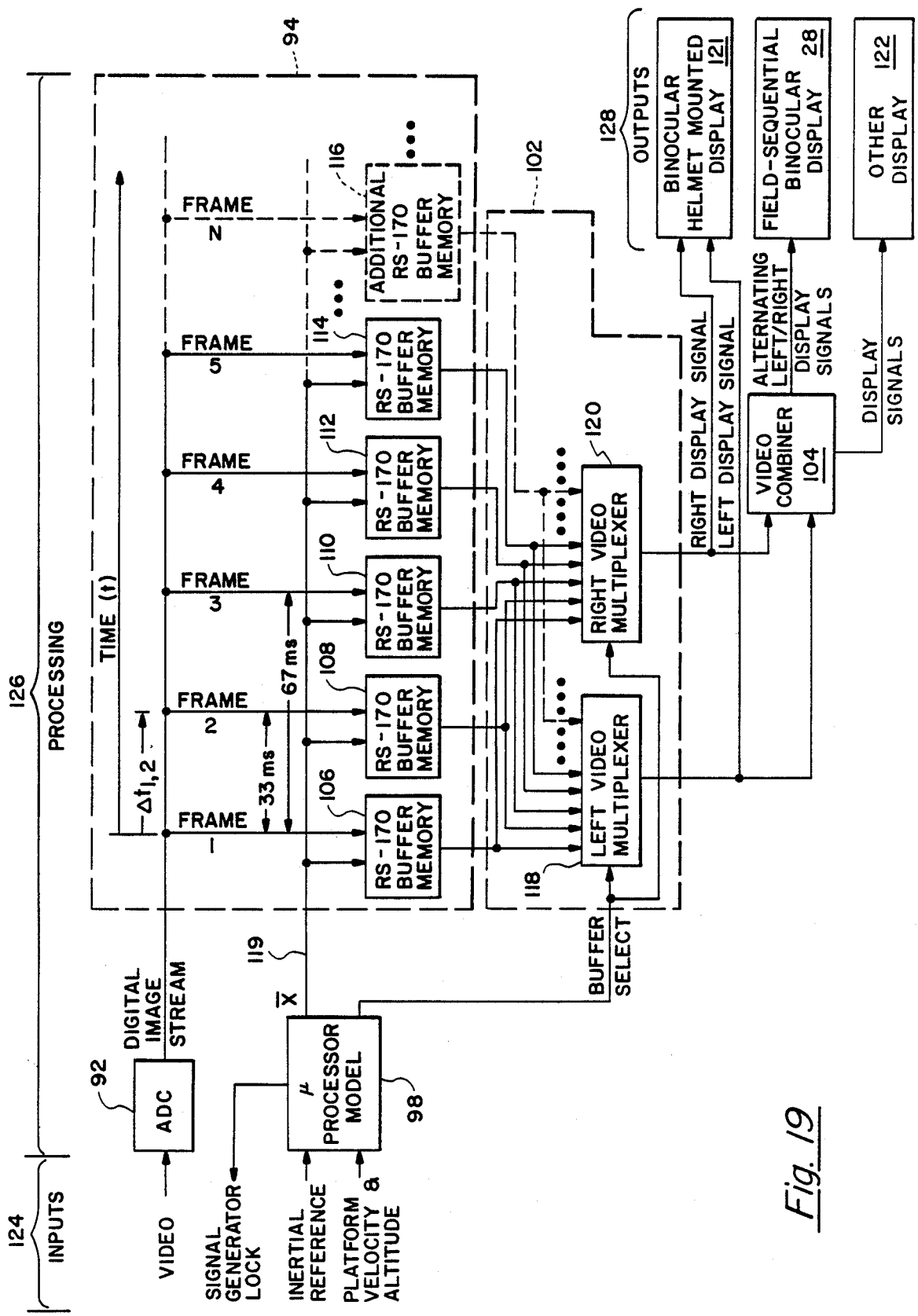
FIG. 19 is a detailed diagram of the embodiment.
Figure 20:
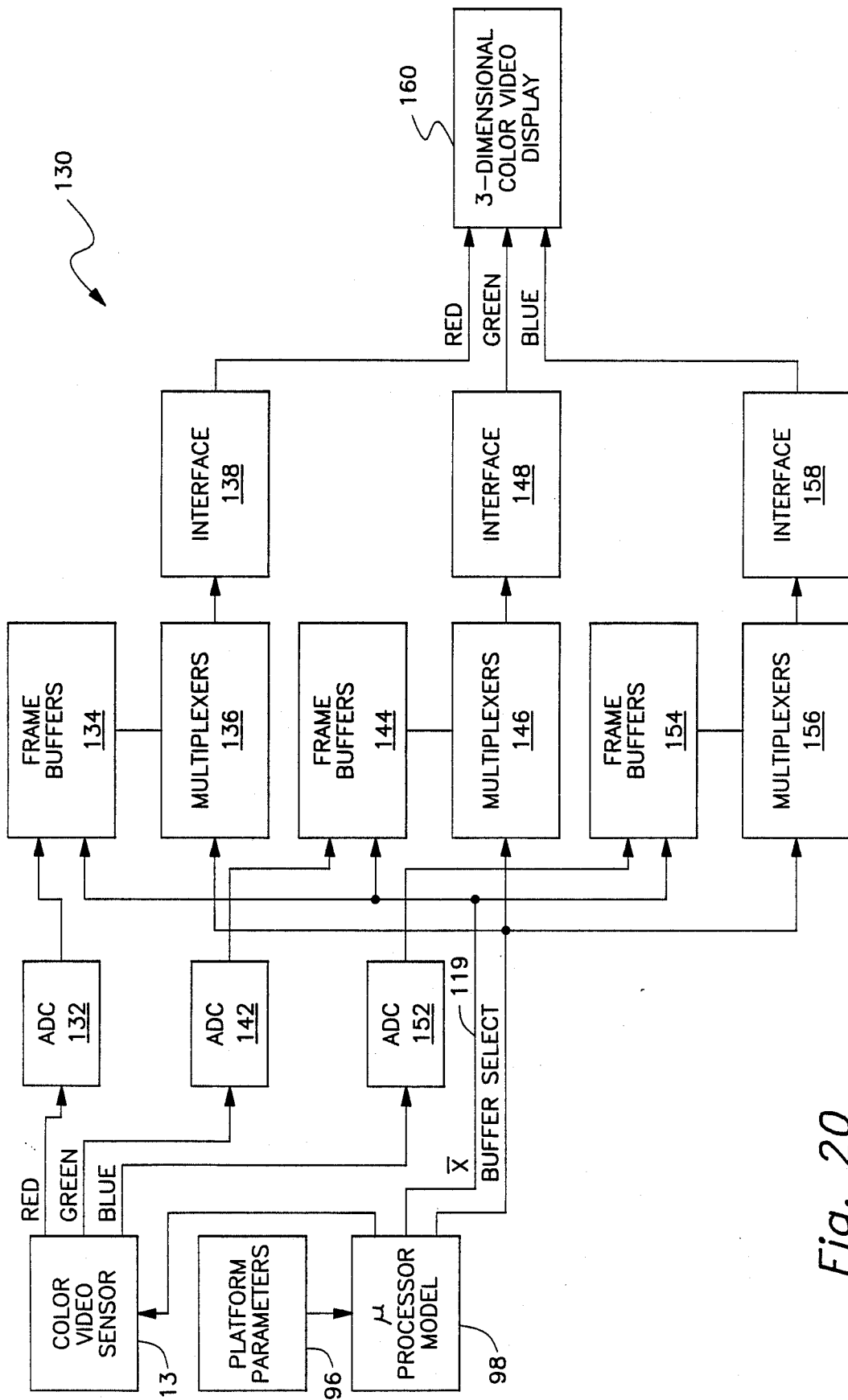
FIG. 20 is a block diagram of the embodiment utilized for single sensor three dimensional color imaging.

FIGS. 18, 19 and 20 show block diagrams of an embodiment 90, including a color video version 130, of the present invention. All connecting lines in FIGS. 18, 19 and 20, can carry either parallel or serial signals. In FIG. 18, sensor 12 may be a charged coupled device (CCD) video camera, an infrared imaging sensor, or other image sensing device. In this particular embodiment 90, sensor 12 is a video CCD camera which sends a 30 Hz frame to analog-to-digital converter 92. Analog-to-digital converter 92 sends a digital image stream to frame buffers 94. For appropriate full field of view stereo displaying, frame buffers 94 split the frames into subframes, according to left and right field of view 32 and 34, and recombine them, as described above. Inertial field reference 30 or 31, which splits the sensor 12 field of view, is determined by microprocessor 98 for modeling together with other parameters such as velocity and altitude of the platform 20, sent as signals from platform parameters 96. Processed signals are sent by microprocessor 98 to frame buffers 94 for implementing inertial field midline 30 or 31 for each frame. Additionally, microprocessor 98 sends a buffer select signal to multiplexers 102 which select frames having particular time delays for effecting stereo display of sensed objects 14. Selected frames by multiplexers 102 are sent to interface 104 for combining, signal conditioning, or just for passing on the signal as sent out from the multiplexers 102 on to three dimensional display 28. Microprocessor model 28 also sends a signal generator lock signal to sensor 12 for purposes of synchronization.

FIG. 19 shows greater detail of electronics which effect the stereoscopic display of data from sensor 12 of embodiment 90 of the present invention. FIG. 19 overall shows in essence a processing section 126 of embodiment 90 in conjunction with inputs 124 and outputs 128. Analog-to-digital converter 92 is an eight-bit converter which receives analog video signals from sensor 12 and converts them into a stream of digital signals which are fed onto frame buffers 94. Frame buffers 94 consist of a series of RS-170 buffer memories 106, 108, 110, 112, 114 and 116. Buffer memories are each designed to hold a monoscopic frame, each frame having a 33 millisecond delay from the other. After the first frame, any one of the subsequent frames is selected in accordance with a desired delay to provide a particular stereo effect depending upon distance of viewed objects 14, platform velocity and altitude of the platform 20. For instance, buffer memory 106 may hold the first frame (having buffer 106 arbitrarily labeled as frame number 1) for indicating the order of a certain series of frames being fed to the buffer memories according to time. Buffers 108, 110, 112 and 114 each are designed to hold the second, third, fourth and fifth frames, respectively, of the video information. These buffers have adjustable windows which allow for frame cutting and recombination in accordance with the location of inertial field midline 30 or 31 relative to the direction of optical axis 18 as depicted above. These windows are selected by an input line 119 from the microprocessor model 98. Microprocessor model 98 takes inertial reference, platform velocity and altitude information to provide an $\overline{X}$ signal down line 119 for purposes of a model selection of buffer windows to optimize the $\Delta t$ between the selected frames for effecting the three dimensional effect on displays 28, 121 and 122. The $\overline{X}$ signal on line 119 is an averaged X of two buffers selected for a stereo frame. This signal is derived mainly from the inertial reference, i.e., motion axis 16, which is translated to an X axis number (i.e., pixel column number) of a buffer column (X). A model based on aforementioned parameters and calculated by microprocessor 98 determines sizes of buffer windows of buffers 106, 108, 110, 112 and 114. Two of these buffers are selected by left eye video multiplexer 118 and right eye video multiplexer 120 as determined by buffer select line to multiplexers 118 and 120 from microprocessor 98. The buffer selection optimizes $\Delta t$, i.e., duration of time between selected frames, which is specific for a particular mission of platform 20. Microprocessor 98 is dedicated to these determinations. Buffer 106 may be selected at any given time as the earliest frame to be viewed and one other buffer determined by the amount of delay desired for stereoscopic effect is selected. The time difference from one buffer to another is 33 milliseconds multiplied by the number of buffers down-stream from buffer 106. One or more additional RS-170 buffer memories 116 may be added for additional delay. The total number of buffers incorporated in frame buffers 94 depends on the maximum amount of delay desired or required between the earliest and latest frame for stereoscopic display purposes. The outputs of left and right video multiplexers 118 and 120, which are left eye display and right eye display signals, respectively, may be fed directly to binocular helmet mounted display 121. Also, the signals from the left and right video multiplexers 118 and 120 may be combined by video combiner 104 into a signal to be fed down one line as alternating left/right display signals to field-sequential binocular display 28. Recorder 103 is connected to multiplexers 102. Recorder 103 is for delayed recordings of images for replaying and viewing at a substantially later time than the time of the recording. Video combiner 104 may condition the display signals from multiplexer 118 and 120 into a form for reception on other kinds of displays such as display 122.

FIG. 20 shows embodiment 90 as illustrated in FIGS. 18 and 19 expanded for a single sensor three dimensional color video display system 130. The color video embodiment 130 is in essence a triplicate of much of the electronics described in FIGS. 18 and 19. Color video sensor 13 is mounted similarly as video sensor 12 on platform 20. Platform parameters device 96 and microprocessor model 98 are each single in number and the same as those in embodiment 90. Color video sensor 13 sends out three signals each of which is a video analog intensity signal like that from sensor 12, except that each of the three signals from color video sensor 13 is grounded in a primary color, i.e., red, green and blue, respectively. The red, green and blue video analog signals are converted by analog-to-digital converters 132, 142 and 152, respectively. These analog-to-digital converters send out digital image streams to frame buffers 134, 144 and 154, respectively, which have identical window adjustments for purposes of cutting frames into subframes and recombining the subframes into displays having inertial field midline 30 as determined by $\bar{X}$ sent down line 119 to the frame buffers 134, 144 and 154. The outputs of frame buffers 134, 144 and 154 are sent to multiplexers 136, 146 and 156, corresponding to red, green and blue signals, respectively. Buffer-select signals from microprocessor 98 are sent to multiplexers 136, 146 and 156, to select the respective frames for combining and transmission as right and left display signals based in the three primary colors including red, green and blue. The outputs of multiplexers 136, 146 and 156 are sent to interfaces 138, 148 and 158 for video combining or other signal conditioning for display purposes. The resultant display signals for red, green and blue components, from interfaces 138, 148 and 158, respectively, are sent to video display 160 so that an observer may view, in three dimensional color, an image picked up by single sensor 13.

The embodiments of the invention in which an exclusive property or right is claimed are defined as follows:

1. A single sensor three-dimensional imaging system comprising:
    a single sensor mounted on a moving platform;
    processing means, connected to said sensing means, comprising:
        converting means, connected to said sensing means, for converting analog signals to digital signals;
        buffer means, connected to said converting means, for storing, cutting and recombining images; and
        multiplexing means, connected to said buffer means and to said display means, for multiplexing images from said buffer means to said display means; and
    display means, connected to said processing means, for displaying three-dimensional images.

2. Apparatus of claim 1 wherein said platform is forward-moving along a line of inertia having said said sensor rotable in a plane parallel to said platform so as to sense from various directions.

3. Apparatus of claim 1 wherein said converting means converts images composed of analog signals to images composed of digital signals.

4. Apparatus of claim 3 wherein said buffer means sequentially stores images from said converting means, each image sensed at a different time than another image.

5. Apparatus of claim 4 wherein said multiplexing means selects pairs of images for three dimensional displaying and sends the pairs of images to said display means for three dimensional viewing.

6. Apparatus of claim 5 wherein said processing means further comprises a microprocessor means for processing platform parameters including inertial reference indicating direction of movement of a platform upon which said sensing means is mounted, and for providing inertial field midline signals to said buffer means and buffer select signals to said multiplexing means.

7. Apparatus of claim 6 wherein said processing means splits images into subframes along the inertial field midline and recombines the subframes into images so that each pair of images sent to said display means provides three dimensional images for viewing.

8. Apparatus of claim 7 wherein said processing means sends pairs of images to said display means resulting in three dimensional images based on radial parallax.

9. Apparatus of claim 7 wherein said processing means sends images to said display means for near real-time viewing of images sensed by said sensing means.

10. Apparatus of claim 1 wherein said processing means further comprises video combining means, connected to said multiplexing means and to said display means, for combining images.

11. Apparatus of claim 10 comprising a recording means, connected to said multiplexing means, for recording images at one time and replaying the recorded images for displaying at a substantially later time.

12. A three dimensional imaging system comprising:
    a single sensor;
    an image processor, connected to said single sensor, comprising:
        an analog-to-digital converter connected to said single sensor;
        at least one frame buffer connected to said analog-to-digital converter;
        at least one multiplexer connected to said at least one frame buffer and to said three dimensional display; and
        microprocessor means for parameter modeling, connected to said at least one frame buffer and to said at least one multiplexer; and
    three dimensional display connected to said image processor.

13. Apparatus of claim 12 wherein said image processor further comprises an interface connected to said at least one multiplexer and to said three dimensional display.

14. Apparatus of claim 13 wherein said three dimensional display presents color three dimensional images for viewing.

15. Apparatus of claim 14 wherein said display presents near real-time and delayed-time images for viewing.

16. Apparatus of claim 12 wherein said single sensor is mounted on a moving platform.

17. Apparatus of claim 16 further comprises a platform parameters circuit means, connected to said microprocessor means, for converting platform parameters to signals.

18. A method of three dimensional imaging comprising the steps of:
sensing a first plurality of images of world objects, with a single means for sensing;
moving said means for sensing relative to reference of said world objects, thereby creating a radial parallax among said objects;
determining direction of movement of said single means for sensing, relative to said reference of world objects;
processing said first plurality of images into a second plurality of images, comprising:
cutting each of said first plurality of images into parts; and
combining said parts of each image of said first plurality of images into a second plurality of images;
multiplexing said second plurality of images; and
displaying said second plurality of images for color three dimensional viewing in the form of motion pictures.

19. Method of claim 18 further comprising a step of recording said second plurality of images for viewing at a substantially later time than the time of said recording.

20. Method of claim 18 wherein said processing further comprises transmitting said signals for said displaying.

21. Method of claim 20 wherein said processing further comprises implementing direction of movement of said determining direction of movement of said single means for sensing, to said cutting and said combining the parts of each of said first plurality of images into said second plurality of images such that each image of said second plurality is combined of parts of two different images of said first plurality, said images cut and combined along a line defined by said direction of movement.

22. Method of claim 21 wherein said processing further comprises conditioning said second plurality of images.

* * * * *